United States Patent [19]

Diemer et al.

[11] Patent Number: 4,583,243
[45] Date of Patent: Apr. 15, 1986

[54] X-RAY TUBE FOR GENERATING SOFT X-RAYS

[75] Inventors: Willem H. Diemer; Pieter Hokkeling; Hubertus F. M. Wagemans, all of Eindhoven, Netherlands

[73] Assignee: U.S. Philips Corporation, New York, N.Y.

[21] Appl. No.: 609,615

[22] Filed: May 14, 1984

[30] Foreign Application Priority Data

May 25, 1983 [NL] Netherlands ........................ 8301838

[51] Int. Cl.⁴ ............................................ H01J 35/08
[52] U.S. Cl. ..................................... 378/143; 378/121
[58] Field of Search ............... 378/143, 144, 127, 128, 378/129

[56] References Cited

U.S. PATENT DOCUMENTS 3,138,729  6/1964  Henke ................................ 378/143

Primary Examiner—Craig E. Church
Attorney, Agent, or Firm—Robert J. Kraus

[57] ABSTRACT

In an X-ray tube, particularly for the detection of elements having a low atomic number by X-ray spectral analysis, an anode support (4) is on the target side provided with a layer (7) of scandium. The scandium layer is provided on the support by adhesion via an intermediate layer (8), preferably of chromium. In a reflection tube, the anode support for the intermediate layer and the scandium layer is preferably made of silver or copper. In a transmission tube, the scandium is provided on a beryllium disc which acts as intermediate layer and as an exit window (6).

9 Claims, 1 Drawing Figure

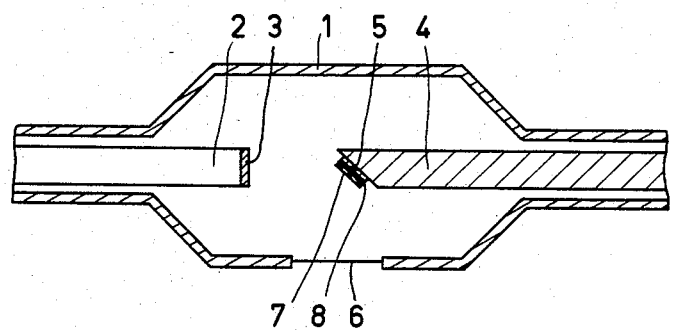

X-RAY TUBE FOR GENERATING SOFT X-RAYS

BACKGROUND OF THE INVENTION

The invention relates to an X-ray tube comprising a cathode and an anode which are accommodated in an envelope, said anode comprising an anode support which is made of a material having comparatively high thermal conductivity.

An X-ray tube of this kind is known from U.S. Pat. No. 4,205,251. For the detection of elements having a comparatively low atomic number, for example lower than 20, by means of X-ray spectral analysis, known X-ray tubes are not ideally suitable, because the X-rays to be generated therein for the analysis of light elements contain an insufficient amount of long-wave X-rays.

For generating comparatively long-wave X-rays, it is desirable to use an anode material containing an element having a low atomic number. However, problems are then encountered because such materials, for example, are difficult to machine, have a poor thermal conductivity, and are expensive. Moreover, several of these materials frequently also occur in the specimens to be analyzed. The cost and particularly the poor thermal conductivity usually make it unattractive to manufacture an anode block from these materials.

SUMMARY OF THE INVENTION

It is an object of the invention to provide an X-ray tube in which an X-ray beam containing a comparatively large amount of long-wave radiation can be generated without deterioration of the customary favorable thermal and structural properties of the tube and in which the beam contains only a small amount of radiation which is characteristic of one of the customary elements to be analyzed. An important argument in favour of scandium is thus also the fact that scandium occurs only rarely in specimens to be analyzed, so that the characteristic radiation of elements in the specimen to be analyzed is not disturbed by the characteristic radiation of the anode material. To this end, an X-ray tube of the kind set forth in the opening paragraph of this specification is characterized in accordance with the invention in that a target disc which essentially consists of scandium is provided on the anode support by adhesion or galvanic deposition, and using an intermediate layer.

Because a scandium target disc is provided together with an intermediate layer in accordance with the invention, a mechanically strong, suitably homogeneous bond is achieved between the disc and the block. Moreover, the bond is well capable of withstanding large temperature fluctuations and elevated temperatures. The occurrence of seriously disturbing X-rays in an X-ray beam to be generated by means of this tube is also mitigated.

In a preferred embodiment the anode support consists mainly of silver or copper, the intermediate layer consists of titanium, vanadium or chromium, or a mixture of two or more of these elements, which is provided in the form of a thin, suitably adhesive layer on a target side of the anode block or on an anode target to be bonded thereon. Thanks to the use of these materials, the occurrence of disturbing short-wave X-rays in an X-ray beam to be generated is avoided.

The use of chromium for the intermediate layer is particularly attractive. Chromium can be provided on the anode block in a suitably adhesive and homogeneous manner by electrolysis as a layer having a thickness of, for example, 50–100 μm. In a preferred embodiment, a scandium plate having a thickness of, for example, approximately 50 μm is bonded to such a chromium layer by adhesion at a temperature approximately in the range of 800°–100° C.

DESCRIPTION OF THE PREFERRED EMBODIMENTS

An X-ray tube embodying the invention is diagrammatically shown in the single FIGURE of the drawing and comprises an evacuated envelope 1 in which a cathode 2 with an electron-emissive element 3 and an anode support 4 with an anode target 5 are accommodated. A voltage can be applied between the anode and the cathode so that electrons to be emitted by the electron-emissive element are intercepted by the anode in order to generate X-rays therein. An X-ray beam emerging through an exit window 6 can irradiate (if desired via a radiation filter) a monochromator crystal or specimen arranged in an X-ray analysis apparatus.

In accordance with the invention there is provided on the anode target 5 a scandium plate 7 which has a thickness of, for example, 50 μm and a transverse dimension of, for example, approximately 25 mm. In order to generate an X-ray beam containing mainly radiation which is characteristic of scandium, the thickness of the scandium plate is chosen so that the electrons cannot penetrate into the underlying material or so that, should X-rays still be generated therein, they are absorbed by the scandium plate. The X-ray beam to be used then remains substantially free of this radiation which would have a disturbing effect because of the deviating wavelength. Scandium, however, cannot be directly deposited on the anode block or the anode target if it consists, for example, of silver or copper because comparatively brittle and hence mechanically weak intermetallic Ag-Sc or Cu-Sc bonds are then formed. Moreover, particularly because of the poor thermal conductivity, it is not attractive to make a complete anode block of scandium. In order to enable the use of scandium as the target material, which is to be preferred from a point of view of temperature resistance, vapour pressure at elevated temperatures, but principally because of its favorable radiation spectrum, use is made of an intermediate layer 8. From a metallurgical point of view, this layer could consist, for example of one of the elements V (23), Nb (41), Ta (73), Cr (24), Mo (42) or W (74) or a combination of any two or more thereof. The elements of this group which have an atomic number above approximately 40 have the drawback that disturbing x-rays can be generated therein. In order to restrict this possibility, the use of V, Cr, or a combination thereof is attractive. Chromium offers the additional advantage that a thin, suitably homogeneous and adhesive layer can be provided on the anode block by electrolysis in a comparatively simple manner. On a chromium layer thus deposited a scandium plate can be provided by adhesion so that a suitable bond is obtained. The bonding process is performed, for example, in an argon atmosphere at a temperature of approximately from 800° to 1000° C., the scandium plate being pressed onto the chromium layer, for example, 30 minutes with a pressure of, for example, 100 kg/cm². A suitable bond is very desirable for a good X-ray tube. Very severe requirements must be imposed notably as regards the homogeneity of the bond, which means that the occurrence of local heat resistances, inclusions and the like must be avoided, particularly because the service life of the tube could otherwise be substantially reduced. A suitable bond can also be achieved, for example, by depositing for example by a diffusion process a chromium film simultaneously with a scandium film on an anode target, preferably in a low-oxygen atmosphere.

Furthermore, the bond should preferably be capable of withstanding temperature fluctuations, for example between 0° C. and 600° C., and it should preferably also have a high melting point, for example at least 800° C., because of potential further work performed on the anode, such as the soldering of a scandium-coated anode target structure to a further anode block by means of Cu-Ag solder. It is preferable to use materials for the anode construction having a vapour pressure of less than about $10^{-6}$ torr at a temperature of approximately 600° C., otherwise the service life of the tube could also be reduced.

An X-ray tube embodying the invention may alternatively comprise a rotary anode, for example for use in an X-ray analysis apparatus in which a high radiation density and a comparatively small emissive surface are required, for example for a spectrometer or the like. The scandium disc then is substituted, for example, by a ring which corresponds to a focal path described on the anode by the electron beam. In order to obtain a high radiation density, use can alternatively be made of an X-ray tube as described in U.S. Pat. No. 3,914,633 whose stubby anode is provided with a scandium disc on its target side.

In a transmission X-ray tube, that is to say an X-ray tube in which the X-rays emerge from the side of the anode remote from the target for the electron beam, a scandium coating can be provided on the inner side of a Be plate which acts as the anode target carrier as intermediate layer and also as the exit window. X-rays generated in the scandium then leave the X-ray tube via the Be window which has a thickness, for example, 150-500 μm.

It has already been stated that the thickness of the scandium layer should preferably be sufficient for comparatively pure scandium radiation to be generated, and that the intermediate layer should preferably be chosen from elements whose characteristic radiation is absorbed to a high degree in the scandium layer. However, it may alternatively be attractive to make available the X-rays generated in the intermediate layer, for example by application of a higher voltage. A solution in this respect is described in our U.S. patent application Ser. No. 613,655 filed on 23 May 1984. A double-layer anode tube of this kind, particularly containing scandium as one of the anode target materials, can be constructed in exactly the same way as the above tube, be it that the scandium layer will be substantially thinner in accordance with the desired radiation spectrum. A suitable thickness may be from 1 μm to some tens of μm.

An X-ray tube embodying the invention is particularly suitable for use in an X-ray analysis apparatus which serves to demonstrate the presence of elements having a low atomic number in a specimen. When use is made of a scandium disc, the effective radiation yield is then more than twice as great as when chromium is used as the target material.

What is claimed is:

1. An X-ray tube comprising a cathode and an anode which are accommodated in an envelope, said anode comprising an anode support which is made of a material having a comparatively high thermal conductivity, characterized in that a target disc which consists essentially of scandium is provided on the anode support by adhesion using an intermediate layer resulting in a mechanically strong uniform joint.

2. An X-ray tube as claimed in claim 1, characterized in that the intermediate layer consists essentially of at least one of the elements from the group consisting of Ti (22), V (23) and Cr (24).

3. An X-ray tube as claimed in claim 2, characterized in that the anode support consists essentially of at least one of the elements selected from the group consisting of copper and silver.

4. An X-ray tube as claimed in claim 3, characterized in that the intermediate layer consists essentially of chromium which is electrolytically deposited on an anode target plate attached to the anode support.

5. An X-ray tube as claimed in claim 2 or 3, characterized in that the intermediate layer and the scandium target disc are adhesively attached to an anode target plate attached to the anode support.

6. An X-ray tube as claimed in claim 4, characterized in that the chromium layer has a thickness of approximately 50-100 μm, and the scandium target disc has a thickness of approximately 50 μm.

7. An X-ray tube as claimed in any of claim 1 or 2, characterized in that the scandium target plate is provided on a beryllium window which acts as the exit window for the X-ray tube.

8. An X-ray tube as claimed in claim 1, 2, 3 or 4, characterized in that the thickness of the scandium target disc and the material of the intermediate layer are adapted to generate different X-ray spectra with different acceleration voltages.

9. An X-ray analysis apparatus including an X-ray tube comprising an anode support which is made of a material having a comparatively high thermal conductivity, characterized in that a target disc which consists essentially of scandium is provided on the anode support by adhesion using an intermediate layer resulting in a mechanically strong uniform joint.

* * * * *